US008917526B2

(12) United States Patent
Huang et al.

(10) Patent No.: US 8,917,526 B2
(45) Date of Patent: Dec. 23, 2014

(54) FLAT CABLE AND CABLE HARNESS USING THE SAME

(75) Inventors: Detian Huang, Hitachi (JP); Kazushige Nagano, Hitachi (JP); Yuuki Yamamoto, Hitachi (JP); Hiroshi Komuro, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 286 days.

(21) Appl. No.: 13/433,225

(22) Filed: Mar. 28, 2012

(65) Prior Publication Data

US 2013/0058069 A1 Mar. 7, 2013

(30) Foreign Application Priority Data

Sep. 6, 2011 (JP) ................................. 2011-193772

(51) Int. Cl.
*H02B 1/20* (2006.01)
*H01B 7/08* (2006.01)
*H01B 7/18* (2006.01)

(52) U.S. Cl.
CPC ................ *H01B 7/083* (2013.01); *H01B 7/182* (2013.01)
USPC ........................................ 361/826; 174/117 F

(58) Field of Classification Search
USPC ....... 361/825, 826; 174/117 M, 117 F, 120 R, 174/72 A
See application file for complete search history.

(56) References Cited

U.S. PATENT DOCUMENTS

| | | | | | |
|---|---|---|---|---|---|
| 3,582,537 | A * | 6/1971 | Perreault | .................. | 174/117 M |
| 3,823,253 | A * | 7/1974 | Walters et al. | .................. | 174/69 |
| 4,083,615 | A * | 4/1978 | Volinskie | ...................... | 439/402 |
| 5,084,594 | A * | 1/1992 | Cady et al. | ...................... | 174/36 |
| 5,635,677 | A | 6/1997 | Wood et al. | | |
| 5,665,940 | A * | 9/1997 | Chimura et al. | .............. | 174/116 |
| 6,730,622 | B2 * | 5/2004 | Curro et al. | ................... | 442/336 |
| 7,220,332 | B2 * | 5/2007 | Curro et al. | ................... | 156/229 |
| 8,294,029 | B2 * | 10/2012 | Tatsumi | .................... | 174/110 R |
| 2010/0089610 | A1 * | 4/2010 | Matsumoto | ................ | 174/117 F |

FOREIGN PATENT DOCUMENTS

| | | |
|---|---|---|
| JP | T-07-505498 | 6/1995 |
| JP | 2001-101934 A | 4/2001 |
| JP | 2005-141923 A | 6/2005 |
| JP | 2008-235024 | 10/2008 |
| JP | 2010-211937 A | 9/2010 |
| JP | 2011-119138 A | 6/2011 |
| WO | WO 93/20563 | 10/1993 |

OTHER PUBLICATIONS

Japanese Office Action dated Sep. 12, 2014 with English Translation.

* cited by examiner

*Primary Examiner* — Hung S Bui

(74) *Attorney, Agent, or Firm* — McGinn IP Law Group, PLLC

(57) ABSTRACT

A flat cable includes a plurality of wires arranged in parallel, and a fibrous member woven into the plurality of wires in the arrangement direction of the plurality of wires. The fibrous member includes a polyurethane elastic fiber, and has an elongation of not less than 500% and not more than 900%, an elongation recovery rate of not less than 90% at a 300% elongation and an initial modulus of 5 to 30 cN/dtex for the 300% elongation.

19 Claims, 1 Drawing Sheet

FLAT CABLE AND CABLE HARNESS USING THE SAME

The present application is based on Japanese patent application No. 2011 193772 filed on Sep. 6, 2011, the entire contents of which are incorporated herein by once.

BACKGROUND OF THE INVENTION

1. Field of the Invention

This invention relates to a flat cable to be placed in a limited wiring space inside small electronic devices such as a portable information terminal, a portable communication terminal that is recently needed to further reduce in size and thickness, and a cable harness using the flat cable.

2. Description of the Related Art

As a wiring material to be placed in a wiring space requiring flexibility and elasticity, a flat cable is known, the flat cable having a configuration that plural thinned coaxial cables are arranged in a flat shape and wefts of polyester are woven approximately perpendicular to the longitudinal direction of the plural coaxial cables arranged in a flat shape such that they thread their ways through the plurality of the coaxial cables (for example, refer to JP-A-2001-101934).

JP-A-2005-141923 discloses a multi-conductor cable in which wefts are woven into plural electric wires, and which is bundled so as to have a shape close to a round shape by the contraction of the wefts.

SUMMARY OF THE INVENTION

In recent small electronic devices, further reduction in size and thickness is quickly required. Thus there is a tendency that when a wiring material is placed inside the small electronic devices, the wiring space is limited more than before. For example, according to the reduction in size and thickness of the small electronic devices, at a predetermined place of the wiring space, there is a limitation that for example, the width and wiring shape of the wiring space are not constant. Consequently, as a wiring material, a flat cable that is capable of being placed in the above limited wiring space is strongly required. However, for the structure of the conventional flat cable, it is needed to select a weft that is flexible and soluble in a solvent, and the fact has constituted a restriction on designing a flat cable so as to have a structure that is capable of being placed in the above limited wiring space.

Accordingly, it is an object of the invention to provide a flat cable that is capable of being placed in a limited wiring space, as well as a cable harness using the flat cable.

(1) According to one embodiment of the invention, a flat cable comprises:

a plurality of wires arranged in parallel; and a fibrous member woven into the plurality of wires in the arrangement direction of the plurality of wires, wherein the fibrous member comprises a polyurethane elastic fiber, and has an elongation of not less than 500% and not more than 900%, an elongation recovery rate of not less than 90% at a 300% elongation and an initial modulus of 5 to 30 cN/dtex for the 300% elongation.

In the above embodiment (1) of the invention, the following modifications and changes can be made.

(i) The fibrous member comprises monofilament.

(ii) The fibrous member is expandable when being woven into the plurality of wires.

(iii) The plurality of wires each have a diameter of not more than 0.23 mm and a wiring pitch of not more than 0.25 mm.

(2) According to another embodiment of the invention, a cable harness comprises:

the flat cable according to the embodiment (1); and a connector connected to a terminal part of the flat cable.

In the above embodiment (2) of the invention, the following modifications and changes can be made.

(iv) The flat cable is stretchable in the width direction of the flat cable.

(v) A part or the whole of the flat cable is folded in the longitudinal direction.

(vi) The flat cable has a width nonconstant in the longitudinal direction.

(vii) The connector comprises a paddle card comprising a substrate and terminals on both surfaces of the substrate.

(3) According to another embodiment of the invention, a method of making a flat cable comprises:

arranging a plurality of wires in parallel; and weaving a fibrous member into the plurality of wires in the arrangement direction of the plurality of wires, wherein the fibrous member is woven into the plurality of wires while being elongated at an elongation of not less than 200% and not more than 400%.

Points of the Invention

According to one embodiment of the invention, a flat cable is constructed such that a fibrous member of a polyurethane elastic fiber is woven into electric wires so as to thread its way through the electric wires by using a fiber having an extremely small fineness and by elongating the fiber. After the fibrous member is woven into the electric wires, a force (an elongation recovery force) generated when the elongation of the fiber is recovered acts such that the electric wires are gathered with each other. Due to this, a distance (an arrangement pitch) between the adjacent electric wires can be reduced without allowing the electric wires to be stressed, so the width of the flat cable can be reduced than before.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Figure 1:
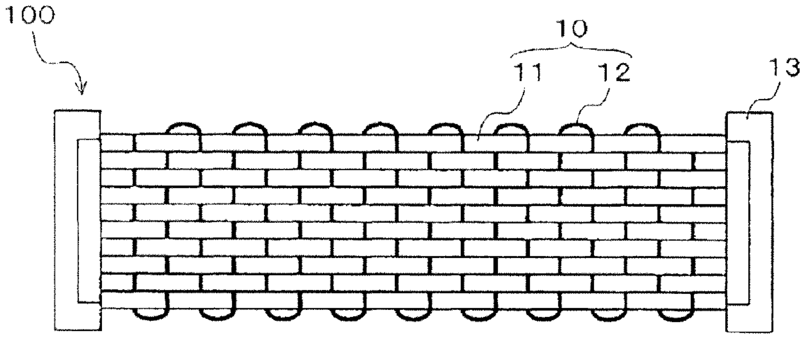
FIG. 1 is a plan view schematically showing a cable harness using a flat cable according to an embodiment of the invention.

The preferred embodiments according to the invention will he explained below referring to the drawings.

FIG. 1 is a plan view schematically showing a cable harness using a flat cable according to an embodiment of the invention.

As shown in FIG. 1, a flat cable 10 according to the embodiment includes a plurality of electric wires 11 arranged in parallel with each other; and a fibrous member 12 woven into the electric wires 11 along the parallel arrangement direction (the direction approximately perpendicular to the longitudinal direction of the electric wire 11) of the electric wires 11 such that it threads its way through the plurality of the electric wires 11.

The electric wire 11 is composed of an electric insulated wire including at least an inner conductor formed by stranding a plurality of copper wires, and an insulator formed on the outer periphery of the inner conductor. The insulator is formed by using a fluorine contained resin such as tetrafluoroethylene-perfluoroalkyl vinyl ether copolymer (PFA), tetrafluoroethylene-hexafluoropropylene copolymer (1-EP), ethylene-tetrafluoroethylene copolymer, or polyethylene terephthalate (PET).

In addition, the electric wire 11 can be a coaxial cable including an outer conductor formed by spirally winding or lengthwise disposing the plural metal conductors on the outer periphery of the insulator, and a jacket formed on the outer periphery of the outer conductor. In this case, the outer conductor is formed by using a conductor (single wire or stranded wire) composed of a metal wire such as an annealed copper wire (a metal wire of which surface is subjected to plate processing is also included in the metal wire).

Considering that recently the electric wire 11 is placed in a limited wiring space in small electronic devices for which further reduction in size and thickness is required, it is preferable that the external diameter of the electric wire 11 is not ore than 0.23 mm.

The fibrous member 12 is woven among the plurality of electric wires 11 so as to fix the plurality of the electric wires 11 in a flat shape longitudinally by travelling among the plurality of electric wires 11 in a zigzag manner, namely moving from one end to another end of the flat cable 10 in a longitudinal direction (moving from the left side to the right side in FIG. 1) and reciprocating between one side and another side of the flat cable 10 in a width direction (reciprocating between the lower side and the upper side in FIG. 1).

In this case, it is preferable that the fibrous member 12 is woven into the electric wires 11 such that it threads its way through the plurality of the electric wires 11 on the basis of an electric wire unit, in the center part of the flat cable 10 in the wide direction (in the parallel arrangement direction of the electric wires 11). Further, the center part of the flat cable 10 in the wide direction is not limited to a location on the center axis of the flat cable 10, but includes a location adjacent to the center axis.

By adopting the above-mentioned configuration, all of the electric wires 11 of the flat cable 10 are bound with the fibrous member 12, and a plurality of electric wires 11 are gathered with each other, thereby they are arranged at a constant wiring pitch, so that the width of the flat cable 10 can be reduced.

The fibrous member 12 is woven over the entire length of the flat cable 10, but in order to facilitate the mounting of the connector 13 for connecting the flat cable 10 to the device side, both end portions of the fibrous member 12 in the longitudinal direction of the flat cable 10 are removed. Further, the fibrous member 12 can be separated from the electric wire 11 by merely pulling the distal portion thereof. Consequently, the fibrous member 12 can be removed without any work such as dissolving the fibrous member 12 to a solvent, thus the mounting of the connector 13 can be carried out with a minimum of fuss.

The flat cable 10 is manufactured by a method of arranging a plurality of electric wires 11 in parallel with each other and weaving a fibrous member 12 into the electric wires 11 such that it threads its way through the plurality of the electric wires 11, and has a configuration that a polyurethane elastic fiber (for example, "ROICA" (registered trade mark) manufactured by Asahi Kasei Corporation is used as the fibrous member 12 as one of characteristics thereof.

It is preferable that the polyurethane elastic fiber is a fiber having an extremely high elongation and a low initial modulus. In particular, it is preferable that the polyurethane elastic fiber has an elongation of 500 to 900%, an elongation recovery rate at a 300% elongation of not less than 90% and an initial modulus for the 300% elongation of 5 to 30 cN/dtex. In addition, in terms of enhancement of strength and reduction in size and thickness of the flat cable 10 itself, it is preferable that the fibrous member 12 is formed of monofilament.

As mentioned above, the polyurethane elastic fiber is used as the fibrous member 12, thereby when the fibrous member 12 is woven into the electric wires 11, the fibrous member 12 can be woven into the electric wires 11 such that it threads its way through the plurality of the electric wires 11, while using a fiber having an extremely small fineness, for example, approximately 17 to 45 dtex, and in a state that the fiber is elongated to, for example, not less than 200% and not more than 400% (at this time, the external diameter of the fibrous member 12 is approximately not more than 0.04 mm). In addition, after the fibrous member 12 is woven into the electric wires 11, a force (an elongation recovery force) generated when the elongation of the fiber is recovered (returns to original state) acts such that a plurality of the electric wires 11 are gathered with each other. At this time, even if the external diameter of the electric wire 11 is small, the electric wires 11 can be gathered with each other without providing the electric wires 11 with stress causing small bend by the elongation recovery force. Due to this, a distance (an arrangement pitch) between the electric wires 11 adjacent to each other can be reduced without providing stress for the electric wires 11, and the width of the flat cable 10 can be reduced than ever before. As a result, the fibrous member 12 can be woven into the electric wires 11 without causing undulation and breaking in the electric wires 11.

If the elongation of the fibrous member 12 is less than 200% when weaving the fibrous member 12 into the wires 11, the wires 11 may protrude from the flat cable 10 to be therefore broken when the flat cable 10 is bent or twisted since the fastening force of the fibrous member 12 applied to the wires 11 is reduced. By contrast, if the elongation of the fibrous member 12 is more than 400%, the fastening force of the fibrous member 12 applied to the wires 11 is increased such that the wires 11 may be undulated or broken. Furthermore, since the elongation margin of the fibrous member 12 decreases after the fibrous member 12 is woven into the wires 11, the wires 11 may not be allowed to follow a tension etc. applied to the flat cable 10 in the width direction.

Figure 2:
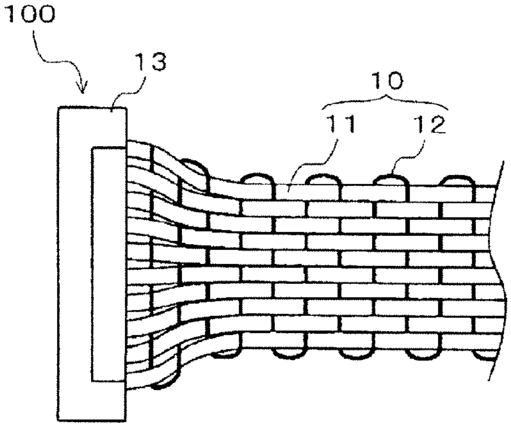
FIG. 2 is a partial enlarged view of a terminal part of the flat cable shown in FIG. 1.
Figure 3A:
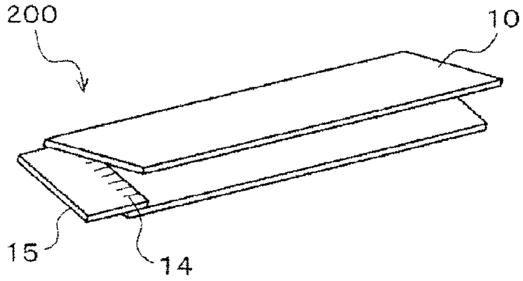
FIG. 3A is a perspective view schematically showing a cable harness according o a modification of the invention.
Figure 3B:
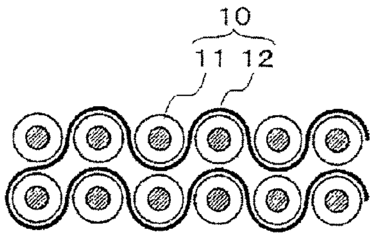
FIG. 3B is a cross-sectional view schematically showing a cable harness according to a modification of the invention.

In addition, the fibrous member 12 formed of a polyurethane elastic fiber can be elongated, even after it has been woven, in the parallel arrangement direction of the electric wires 11 in a state of being woven, so that it can provide the flat cable 10 with a function capable of elongating and contracting the flat cable 10 in the width direction thereof. Due to this, as shown in FIG. 2, the flat cable 10 can be modified to have a non-constant width, and as shown in FIGS. 3A and 3B, the flat cable 10 can be easily folded double or more along the longitudinal direction, so that the flat cable 10 can appropriately change in the shape to have the shape fitting to a limited wiring space, and then it can be placed. Further, only a desired part or the whole of the flat cable in the longitudinal direction can be folded. In addition, a desired part of the flat cable 10 can be folded in a desired angle (for example, 0 to 180 degrees). These modifications can be carried out at not only one place of the flat cable 10 but also a plurality of places of the flat cable 10, and the modifications such as folding or bending can be also carried out at one place simultaneously.

Further, the fibrous member 12 has an initial modulus for the 300% elongation (an initial modulus for elongating the fibrous member 12 by 300%) of 5 to 30 cN/dtex that is low, so that when the fibrous member 12 is woven into the electric wires 11, the weaving work can be carried out without placing burden on the electric wires 11.

If the initial modulus is less than 5 cN/dtex, when the fibrous member 12 is woven, a force tightening the electric wires 11 is weakened, the flat cable 10 having a neat shape cannot be manufactured, and after the fibrous member 12 is woven, another process for giving a better shape to the flat cable 10 is needed, so as to cause an increase in production cost.

If the initial modulus is more than 30 cN/dtex, when the fibrous member 12 is a force tightening the electric wires 11 is heightened, and when the fibrous member 12 is woven, the electric wires 11 are changed in shape in such a way as to undulate or are broken, so that a decrease in electric characteristics may be caused.

For these reasons, it is preferable that the fibrous member 12 has a low (namely, 5 to 30 cN/dtex) initial modulus for elongating the fibrous member 12 by 300%.

The reason why the fibrous member 12 has an elongation of not less than 500% and not more than 900% is that if the elongation is less than 500%, when the fibrous member 12 is woven into the wires 11 or the flat cable 10 is used, the fibrous member 12 may be broken, and that if the elongation is more than 900%, it may not be possible to elongate or gather the wires 11.

The reason why the fibrous member 12 has an elongation recovery rate at a 300% elongation of not less than 90% is that if the elongation recovery rate is less than 90%, when the flat cable 10 is bent and slid, the elongation and contraction property of the fibrous member 12 becomes insufficient so that the electric wires 11 are easily broken due to the sliding of the flat cable 10.

As described above, in short, the flat cable is configured to have a plurality of electric wires arranged in parallel with each other and a fibrous member woven into the electric wires along the parallel arrangement direction of the electric wires such that it threads its way through the plurality of the electric wires, in which the fibrous member is formed of a polyurethane elastic fiber, thereby it can be placed in a limited wiring space, and can be further reduced in size and thickness than ever before.

Hereinafter, advantages of the embodiment will be explained in detail.

The flat cable 10 according to the embodiment adopts a polyurethane elastic fiber as the fibrous member 12, thereby the fibrous member 12 elongated and extremely thinned such that the external diameter is approximately not more than 0.04 mm can be woven, so that further reduction in size and thickness, for example, the wiring pitch of the electric wires 11 is reduced to less than 0.25 mm and the thickness of the flat cable 10 is reduced to less than 0.25 mm, can be realized without enormously reducing the external diameter of the electric wires 11.

Further, in case of conventional flat cables, it is needed to enormously reduce the external diameter of the electric wires in order to realize further reduction in size and thickness. However, if the external diameter of the electric wires is enormously reduced, undulation and breaking are caused in the electric wires by tension generated when the fibrous member is woven, so that a decrease in electric characteristics may be caused.

In addition, the fibrous member 12 of the flat cable 10 has still an allowance for elongation even after it has been woven, so that the flat cable 10 can have an elongation and contraction function in the width direction. By providing the flat cable 10 with the elongation and contraction function, the flat cable 10 can be folded easily and without deteriorating the electric characteristics of the electric wires 11 in a large way. In other words, stress applied to the electric wires 11 when the flat cable 10 is folded is allowed to escape effectively by the elongation and contraction function in the width direction, and the electric wires 11 themselves are less affected by change in shape due to the stress, so that influences on the electric characteristics of the electric wires 11 caused by that the flat cable 10 is folded can be reduced.

Consequently, in the flat cable 10 according to the embodiment, the flat cable 10 is folded along the longitudinal direction, thereby a wiring method capable of reducing a width at the wiring can be adopted. Even if this method is tried to be adopted in conventional flat cables, the fibrous member after it has been woven does not elongate, so that it is difficult to fold the flat cables. In other words, the wiring method that carries out a wiring by folding the flat cable 10 along the longitudinal direction cannot be realized without provision of the flat cable 10.

Further, in addition to the above-mentioned advantages, the following advantage can be also provided, namely, by using the fibrous member 12, the flat cable 10 can be provided with an elongation and contraction property in the width direction, so that stress applied when the flat cable 10 is bent and slid in a wiring space having an extremely slight height is allowed to escape effectively in the width direction of the flat cable 10. As a result, when the flat cable 10 is bent and slid, the electric wires 11 can be moved in the width direction of the flat cable 10, thus even if the flat cable 10 is bent and slid in a wiring space having an extremely slight height, stress applied to the electric wires 11 is reduced, so that the electric wires 11 can he prevented from breaking or the like. In other words, the flat cable 10 according to the embodiment has also an advantage that even if it is placed in a movable part associated with a sliding, it has less incidence of breaking and deterioration of the electric characteristics of the electric wires 11.

In addition, the connector 13 is connected to the terminal parts of the flat cable 10, thereby the cable harness 100 as shown in FIG. 1 that is capable of being placed in a limited wiring space in small electronic devices can be obtained.

As shown in FIG. 2, in the cable harness 100 according to the embodiment, the flat cable 10 has an elongation and contraction function in the width direction, so that the wiring pitch of a plurality of the electric wires 11 at the terminal parts of the flat cable 10 can he freely changed corresponding to the terminal pitch of the connector 13 in a state that the fibrous member 12 is woven. As a result, even if the shape of the connector 13 is limited based on standards or the like, the flat cable 10 can be reduced in width and simultaneously can respond to the standards or the like.

As described above, in the cable harness 100 according to the embodiment, for example, in case of connecting the connector 13 to the terminal parts of the flat cable 10 so as to assemble a harness from the flat cable 10, only a wiring pitch at a predetermined place can be freely changed. In particular, in case of assembling a harness, the wiring pitch at the terminal parts of the flat cable 10 can be changed corresponding to the terminal pitch of the connector 13. Further, in conventional flat cables, the fibrous member after it has been woven does not have an allowance for elongation, thus differently from the above-mentioned embodiment, the wiring pitch could not be freely changed in a state that the fibrous member is woven.

In addition, as shown in FIGS. 3A and 3B, a paddle card 15 having terminals 14 on both surfaces of the substrate is used as the connector 13, and the flat cable 10 is folded along the longitudinal direction by using the elongation and contraction function of the flat cable 10 in the width direction so as to be respectively connected to the terminals 14 of the front and rear surfaces of the paddle card 15 while divided at the folded part as a boundary line, so that a cable harness 200 further reduced in width can be obtained.

According to the cable harness 200, as well as being able to be reduced in width, since the paddle card 15 having terminals 14 on both surfaces of the substrate can be used, the parts count can be reduced in comparison with a case of using two substrates, and production cost can be reduced.

The invention is not limited to the above embodiments, and can be variously modified within the gist thereof.

What is claimed is:

1. A flat cable, comprising:

a plurality of wires arranged in parallel; and a fibrous member of 17 dtex to 45 dtex being woven into the plurality of wires in an arrangement direction of the plurality of wires in a state that the fibrous member is elongated such that an external diameter of the fibrous member is not more than 0.04 mm, wherein the fibrous member comprises a polyurethane elastic fiber and has an elongation of not less than 500% and not more than 900%, an elongation recovery rate of not less than 90% at a 300% elongation, and an initial modulus of 5 cN/dtex to 30 cN/dtex for the 300% elongation.

2. The flat cable according to claim 1, wherein the fibrous member comprises a monofilament.

3. The flat cable according to claim 1, wherein the fibrous member is expandable after being woven into the plurality of wires.

4. The flat cable according to claim 1, wherein the plurality of wires each have a diameter of not more than 0.23 mm and a wiring pitch of not more than 0.25 mm.

5. A cable harness, comprising:

the flat cable according to claim 1; and a connector connected to a part of the flat cable.

6. The cable harness according to claim 5, wherein the flat cable is stretchable in a width direction of the flat cable.

7. The cable harness according to claim 5, wherein a part or an entirety of the flat cable is folded in a longitudinal direction.

8. The cable harness according to claim 5, wherein the flat cable has a width nonconstant in a longitudinal direction.

9. The cable harness according to claim 5, wherein the connector comprises a paddle card comprising a substrate and terminals on both surfaces of the substrate.

10. The flat cable according to claim 1, wherein, in the state that the fibrous member is elongated, the fibrous member is elongated at an elongation in a range from 200% to 400%.

11. The flat cable according to claim 1, wherein the fibrous member is woven over and under the plurality of wires along the arrangement direction of the wires.

12. The flat cable according to claim 1, wherein the arrangement direction of the wires includes a direction of stacking of the wires such that the fibrous member extends along the direction of stacking of the wires.

13. The flat cable according to claim 1, wherein the arrangement direction of the wires includes a perpendicular direction to a lateral direction of extension of the wires.

14. A method of making a flat cable, comprising:

arranging a plurality of wires in parallel; and weaving a fibrous member of 17 dtex to 45 dtex into the plurality of wires in the arrangement direction of the plurality of wires in a state that the fibrous member is elongated such that an external diameter of the fibrous member is not more than 0.04 mm, wherein the fibrous member is woven into the plurality of wires while being elongated at an elongation of not less than 200% and not more than 400% , the fibrous member having an elongation recovery rate of not less than 90% at a 300% elongation, and an initial modulus of 5 cN/dtex to 30 cN/dtex for the 300% elongation.

15. A flat cable, comprising:

a plurality of wires arranged in parallel; and a fibrous member of 17 dtex to 45 dtex being woven into the plurality of wires in an arrangement direction of the plurality of wires in a state that the fibrous member is elongated at an elongation of not less than 200% and not more than 400%, wherein the fibrous member comprises a polyurethane elastic fiber of 17 dtex to 45 dtex, and has an elongation of not less than 500% and not more than 900%, an elongation recovery rate of not less than 90% at a 300% elongation, and an initial modulus of 5 cN/dtex to 30 cN/dtex for the 300% elongation.

16. The flat cable according to claim 15, wherein, in the state that the fibrous member is elongated, an outer diameter of the fibrous member is 0.04 mm or less.

17. The flat cable according to claim 15, wherein the fibrous member is woven over and under the plurality of wires along the arrangement direction of the wires.

18. The flat cable according to claim 15, wherein the arrangement direction of the wires includes a direction of stacking of the wires such that the fibrous member extends along the direction of stacking of the wires.

19. The flat cable according to claim 15, wherein the arrangement direction of the wires includes a perpendicular direction to a lateral direction of extension of the wires.

* * * * *